United States Patent
Hurst et al.

(10) Patent No.: US 8,370,514 B2
(45) Date of Patent: Feb. 5, 2013

(54) SYSTEM AND METHOD OF MINIMIZING NETWORK BANDWIDTH RETRIEVED FROM AN EXTERNAL NETWORK

(75) Inventors: Mark B. Hurst, Cedar Hills, UT (US); Loren Larsen, American Fork, UT (US); David S. Anderson, Salt Lake City, UT (US); Lei Wang, Provo, UT (US)

(73) Assignee: DISH Digital L.L.C., Englewood, CO (US)

(*) Notice: Subject to any disclaimer, the term of this patent is extended or adjusted under 35 U.S.C. 154(b) by 635 days.

(21) Appl. No.: 12/075,475

(22) Filed: Mar. 10, 2008

(65) Prior Publication Data

US 2008/0222235 A1 Sep. 11, 2008

Related U.S. Application Data

(63) Continuation-in-part of application No. 11/116,783, filed on Apr. 28, 2005, and a continuation-in-part of application No. 11/673,483, filed on Feb. 9, 2007, and a continuation-in-part of application No. 11/834,548, filed on Aug. 6, 2007, and a continuation-in-part of application No. 11/737,669, filed on Apr. 19, 2007.

(51) Int. Cl.
    *G06F 15/16* (2006.01)
(52) U.S. Cl. .................. 709/231; 709/246
(58) Field of Classification Search .......... 709/231, 709/246
    See application file for complete search history.

(56) References Cited

U.S. PATENT DOCUMENTS

| | | |
|---|---|---|
| 4,535,355 A | 8/1985 | Arn et al. |
| 5,168,356 A | 12/1992 | Acampora et al. |
| 5,768,527 A | 6/1998 | Zhu et al. |
| 5,953,506 A | 9/1999 | Kalra et al. |
| 6,091,775 A | 7/2000 | Hibi et al. |
| 6,091,777 A | 7/2000 | Guetz et al. |
| 6,122,660 A | 9/2000 | Baransky et al. |
| 6,185,736 B1 | 2/2001 | Ueno |
| 6,195,680 B1 * | 2/2001 | Goldszmidt et al. .......... 709/203 |
| 6,366,614 B1 | 4/2002 | Pian et al. |
| 6,374,289 B2 | 4/2002 | Delaney et al. |
| 6,389,473 B1 | 5/2002 | Carmel et al. |
| 6,486,803 B1 | 11/2002 | Luby et al. |
| 6,490,627 B1 | 12/2002 | Kalra et al. |
| 6,510,553 B1 | 1/2003 | Hazra |
| 6,574,591 B1 | 6/2003 | Kleiman et al. |
| 6,604,118 B2 | 8/2003 | Kleiman et al. |

(Continued)

FOREIGN PATENT DOCUMENTS

| | | |
|---|---|---|
| CA | 2466482 A1 | 5/2003 |
| EP | 0 711 077 A2 | 5/1996 |

(Continued)

OTHER PUBLICATIONS

Liu, Jiangchuan et al., "Opportunities and Challenges of Peer-to-Peer Internet Video Broadcast," School of Computing Science, Simon Fraser Universtiy, British Columbia, Canada, 12 pages.

(Continued)

*Primary Examiner* — Mohamed Ibrahim
(74) *Attorney, Agent, or Firm* — Ingrassia Fisher & Lorenz, P.C.

(57) ABSTRACT

A system and method are provided of minimizing network bandwidth used from an external network by client peers in a local network. The method can include the operation of organizing a plurality of clients each having media streamlets and a client parent in a structure within the local network. Mapping information propagates through the structure. The mapping information represents local streamlet locations as stored by the plurality of clients. Another operation is retrieving a local streamlet from a client identified in the mapping information as having the local streamlet for the requesting client.

25 Claims, 7 Drawing Sheets

U.S. PATENT DOCUMENTS

| | | |
|---|---|---|
| 6,618,752 B1 | 9/2003 | Moore et al. |
| 6,721,723 B1 | 4/2004 | Gibson et al. |
| 6,731,600 B1 | 5/2004 | Patel et al. |
| 6,732,183 B1 | 5/2004 | Graham |
| 6,760,772 B2 | 7/2004 | Zou et al. |
| 6,795,863 B1 | 9/2004 | Doty, Jr. |
| 6,845,107 B1 | 1/2005 | Kitazawa et al. |
| 6,850,965 B2 | 2/2005 | Allen |
| 6,859,839 B1 | 2/2005 | Zahorjan et al. |
| 6,874,015 B2 | 3/2005 | Kaminsky et al. |
| 6,968,387 B2 | 11/2005 | Lanphear |
| 6,976,090 B2 | 12/2005 | Ben-Shaul et al. |
| 7,054,365 B2 | 5/2006 | Kim et al. |
| 7,054,774 B2 | 5/2006 | Batterberry et al. |
| 7,054,911 B1 | 5/2006 | Lango et al. |
| 7,075,986 B2 | 7/2006 | Girod et al. |
| 7,093,001 B2 | 8/2006 | Yang et al. |
| 7,096,271 B1 | 8/2006 | Omoigui et al. |
| 7,099,954 B2 | 8/2006 | Li et al. |
| 7,116,894 B1 | 10/2006 | Chatterton |
| 7,174,385 B2 | 2/2007 | Li |
| 7,194,549 B1 | 3/2007 | Lee et al. |
| 7,240,100 B1 | 7/2007 | Wein et al. |
| 7,260,640 B1 | 8/2007 | Kramer et al. |
| 7,274,740 B2 | 9/2007 | van Beek et al. |
| 7,295,520 B2 | 11/2007 | Lee et al. |
| 7,310,678 B2 | 12/2007 | Gunaseelan et al. |
| 7,325,073 B2 | 1/2008 | Shao et al. |
| 7,334,044 B1 | 2/2008 | Allen |
| 7,349,358 B2 | 3/2008 | Hennessey et al. |
| 7,349,976 B1 | 3/2008 | Glaser et al. |
| 7,369,610 B2 | 5/2008 | Xu et al. |
| 7,376,747 B2 | 5/2008 | Hartop |
| 7,391,717 B2 | 6/2008 | Klemets et al. |
| 7,408,984 B2 | 8/2008 | Lu et al. |
| 7,412,531 B1 | 8/2008 | Lango et al. |
| 7,477,688 B1 | 1/2009 | Zhang et al. |
| 7,523,181 B2 | 4/2009 | Swildens et al. |
| 7,536,469 B2 | 5/2009 | Chou et al. |
| 7,546,355 B2 | 6/2009 | Kalnitsky |
| 7,577,750 B2 * | 8/2009 | Shen et al. .................... 709/231 |
| 7,593,333 B2 | 9/2009 | Li et al. |
| 7,599,307 B2 | 10/2009 | Seckni et al. |
| 7,609,652 B2 | 10/2009 | Kellerer et al. |
| 7,660,906 B1 * | 2/2010 | Armour ........................ 709/231 |
| 7,719,985 B2 | 5/2010 | Lee et al. |
| 7,760,801 B2 | 7/2010 | Ghanbari et al. |
| 7,779,135 B2 | 8/2010 | Hudson et al. |
| 7,788,395 B2 | 8/2010 | Bowra et al. |
| 7,797,439 B2 | 9/2010 | Cherkasova et al. |
| 7,817,985 B2 | 10/2010 | Moon |
| 7,818,444 B2 | 10/2010 | Brueck et al. |
| 2001/0047423 A1 | 11/2001 | Shao et al. |
| 2002/0073167 A1 | 6/2002 | Powell et al. |
| 2002/0091840 A1 | 7/2002 | Pulier et al. |
| 2002/0097750 A1 | 7/2002 | Gunaseelan et al. |
| 2002/0131496 A1 | 9/2002 | Vasudevan et al. |
| 2002/0144276 A1 | 10/2002 | Radford et al. |
| 2002/0152317 A1 | 10/2002 | Wang et al. |
| 2002/0152318 A1 | 10/2002 | Menon et al. |
| 2002/0161898 A1 * | 10/2002 | Hartop et al. .................. 709/227 |
| 2002/0161911 A1 | 10/2002 | Pinckney, III et al. |
| 2002/0169926 A1 | 11/2002 | Pinckney, III et al. |
| 2002/0174434 A1 | 11/2002 | Lee et al. |
| 2002/0176418 A1 | 11/2002 | Hunt et al. |
| 2002/0178330 A1 | 11/2002 | Schlowsky-Fischer et al. |
| 2002/0188745 A1 | 12/2002 | Hughes et al. |
| 2003/0005455 A1 | 1/2003 | Bowers |
| 2003/0014684 A1 | 1/2003 | Kashyap |
| 2003/0018966 A1 | 1/2003 | Cook et al. |
| 2003/0021166 A1 | 1/2003 | Soloff |
| 2003/0065803 A1 | 4/2003 | Heuvelman |
| 2003/0067872 A1 | 4/2003 | Harrell et al. |
| 2003/0081582 A1 | 5/2003 | Jain et al. |
| 2003/0107994 A1 | 6/2003 | Jacobs et al. |
| 2003/0135631 A1 | 7/2003 | Li et al. |
| 2003/0140159 A1 | 7/2003 | Campbell et al. |
| 2003/0151753 A1 | 8/2003 | Li et al. |
| 2003/0152036 A1 | 8/2003 | Quigg Brown et al. |
| 2003/0154239 A1 | 8/2003 | Davis et al. |
| 2003/0204519 A1 | 10/2003 | Sirivara et al. |
| 2004/0003101 A1 | 1/2004 | Roth et al. |
| 2004/0030547 A1 | 2/2004 | Leaning et al. |
| 2004/0030599 A1 | 2/2004 | Sie et al. |
| 2004/0030797 A1 | 2/2004 | Akinlar et al. |
| 2004/0031054 A1 | 2/2004 | Dankworth et al. |
| 2004/0049780 A1 | 3/2004 | Gee |
| 2004/0054551 A1 | 3/2004 | Ausubel et al. |
| 2004/0071209 A1 | 4/2004 | Burg et al. |
| 2004/0083283 A1 | 4/2004 | Sundaram et al. |
| 2004/0093420 A1 | 5/2004 | Gamble |
| 2004/0103444 A1 | 5/2004 | Weinberg et al. |
| 2004/0117427 A1 | 6/2004 | Allen et al. |
| 2004/0143672 A1 * | 7/2004 | Padmanabham et al. ...... 709/231 |
| 2004/0153458 A1 * | 8/2004 | Noble et al. ..................... 707/10 |
| 2004/0168052 A1 | 8/2004 | Clisham et al. |
| 2004/0170392 A1 | 9/2004 | Lu et al. |
| 2004/0220926 A1 | 11/2004 | Lamkin et al. |
| 2004/0260701 A1 | 12/2004 | Lehikoinen et al. |
| 2005/0015509 A1 | 1/2005 | Sitaraman |
| 2005/0055425 A1 | 3/2005 | Lango et al. |
| 2005/0066063 A1 | 3/2005 | Grigorovitch et al. |
| 2005/0076136 A1 | 4/2005 | Cho et al. |
| 2005/0084166 A1 | 4/2005 | Bonch et al. |
| 2005/0108414 A1 | 5/2005 | Taylor et al. |
| 2005/0120107 A1 | 6/2005 | Kagan et al. |
| 2005/0123058 A1 | 6/2005 | Greenbaum et al. |
| 2005/0185578 A1 | 8/2005 | Padmanabhan et al. |
| 2005/0188051 A1 | 8/2005 | Sneh |
| 2005/0204046 A1 | 9/2005 | Watanabe |
| 2005/0262257 A1 | 11/2005 | Major et al. |
| 2006/0059223 A1 | 3/2006 | Klemets et al. |
| 2006/0080718 A1 | 4/2006 | Gray et al. |
| 2006/0130118 A1 | 6/2006 | Damm |
| 2006/0133809 A1 | 6/2006 | Chow et al. |
| 2006/0165166 A1 | 7/2006 | Chou et al. |
| 2006/0168290 A1 | 7/2006 | Doron |
| 2006/0168295 A1 | 7/2006 | Batterberry et al. |
| 2006/0184688 A1 | 8/2006 | Ganguly et al. |
| 2006/0206246 A1 | 9/2006 | Walker |
| 2006/0236219 A1 | 10/2006 | Grigorovitch et al. |
| 2006/0277564 A1 | 12/2006 | Jarman |
| 2007/0024705 A1 | 2/2007 | Richter et al. |
| 2007/0030833 A1 | 2/2007 | Pirzada et al. |
| 2007/0067480 A1 | 3/2007 | Beek et al. |
| 2007/0079325 A1 | 4/2007 | de Heer |
| 2007/0094405 A1 | 4/2007 | Zhang |
| 2007/0204310 A1 | 8/2007 | Hua et al. |
| 2007/0280255 A1 | 12/2007 | Tsang et al. |
| 2008/0028428 A1 | 1/2008 | Jeong et al. |
| 2008/0037527 A1 | 2/2008 | Chan et al. |
| 2008/0046939 A1 | 2/2008 | Lu et al. |
| 2008/0056373 A1 | 3/2008 | Newlin et al. |
| 2008/0133766 A1 | 6/2008 | Luo |
| 2008/0162713 A1 | 7/2008 | Bowra et al. |
| 2008/0195743 A1 | 8/2008 | Brueck et al. |
| 2008/0195744 A1 | 8/2008 | Bowra et al. |
| 2008/0195745 A1 | 8/2008 | Bowra et al. |
| 2008/0205291 A1 | 8/2008 | Li et al. |
| 2008/0219151 A1 | 9/2008 | Ma et al. |
| 2008/0263180 A1 | 10/2008 | Hurst et al. |
| 2008/0281803 A1 | 11/2008 | Gentric |
| 2009/0043906 A1 | 2/2009 | Hurst et al. |
| 2009/0055471 A1 | 2/2009 | Kozat et al. |
| 2009/0055547 A1 | 2/2009 | Hudson et al. |
| 2009/0210549 A1 | 8/2009 | Hudson et al. |
| 2010/0098103 A1 | 4/2010 | Xiong et al. |
| 2011/0035507 A1 | 2/2011 | Brueck et al. |

FOREIGN PATENT DOCUMENTS

| | | |
|---|---|---|
| EP | 0 919 952 A1 | 6/1999 |
| EP | 1641271 A2 | 3/2006 |
| EP | 1 670 256 A2 | 6/2006 |
| EP | 1 777 969 | 4/2007 |
| JP | 2000201343 | 7/2000 |
| JP | 200192752 | 4/2001 |
| JP | 2004054930 | 2/2004 |

| | | | |
|---|---|---|---|
| JP | 2011004225 A | 1/2011 | |
| WO | WO-0067469 | 11/2000 | |
| WO | 0167264 A1 | 9/2001 | |
| WO | 03003760 A2 | 1/2003 | |
| WO | 03009581 A1 | 1/2003 | |
| WO | 03027876 A1 | 4/2003 | |
| WO | 2004025405 A2 | 3/2004 | |
| WO | 2004036824 A1 | 4/2004 | |
| WO | 2006010113 A2 | 1/2006 | |

OTHER PUBLICATIONS

International Search Report and Written Opinion, Application No. PCT/US08/61035, dated Dec. 12, 2008.
International Preliminary Report on Patentability, Application No. PCT/US08/061035, dated Oct. 29, 2009.
PCT Notification of Transmittal of the International Search Report and Written Opinion of the International Searching Authority, for PCT/US05/15091, Oct. 29, 2007, 8 pages.
PCT Notification of Transmittal of the International Preliminary Report on Patentability, for PCT/US05/15091, Oct. 29, 2007, 8 pages.
Advisory Action for U.S. Appl. No. 11/116,783, Mailed Mar. 23, 2010, 4 pages.
Advisory Action for U.S. Appl. No. 11/116,783, Mailed May 17, 2010, 3 pages.
Final Office Action for U.S. Appl. No. 11/116,783, Mailed Feb. 22, 2010, 19 pages.
Office Action for U.S. Appl. No. 11/116,783, Mailed May 14, 2008, 19 pages.
Final Office Action for U.S. Appl. No. 11/116,783, Mailed Feb. 20, 2009, 16 pages.
Supplemental European Search Report, Sep. 22, 2008, (3 pages).
Office Action for U.S. Appl. No. 11/116,783, Aug. 20, 2009, 14 pages.
Advisory Action for U.S. Appl. No. 11/116,783, Mailed Apr. 2, 2009, 3 pages.
Advisory Action for U.S. Appl. No. 11/116,783, Mailed May 12, 2009, 4 pages.
PCT International Search Report and Written Opinion of the International Searching Authority, PCT/US08/09281, Nov. 5, 2008, 9 pages.
PCT International Preliminary Report on Patentability and Written Opinion of the International Searching Authority, PCT/US2008/09281 mailed Feb. 18, 2010, 6 pages.
Notice of Allowance for U.S. Appl. No. 11/673,483, mailed Aug. 5, 2010, 7 pages.
Final Office Action for U.S. Appl. No.11/673,483 mailed Feb. 4, 2010, 21 pages.
Advisory Action for U.S. Appl. No. 11/673,483 mailed Apr. 9, 2010 3 pages.
Advisory Action for U.S. Appl. No. 11/673,483 mailed May 26, 2010 3 pages.
Office Action for U.S. Appl. No. 11/673,483 mailed Jul. 9, 2009, 14 pages.
Office Action for U.S. Appl. No. 11/673,483 mailed Feb. 3, 2009, 9 pages.
Albanese, Andres , et al., "Priority Encoding Transmission", *TR-94-039*, Aug. 1994, 36 pages, International Computer Science Institute, Berkley, California.
Birney, Bill , "Intelligent Streaming", May 2003, *Microsoft*.
Clement, B. , "Move Networks Closes $11.3 Million on First Round VC Funding", Page One PR, *Move Networks, Inc. Press Releases*, Feb. 7, 2007, http://www.move.tv/press/press20070201.html.
Goyal, Vivek K., "Multiple Description coding: Compression Meets the Network", Sep. 2001, pp. 74-93, *IEEE Signal Processing Magazine*.
Move Networks, Inc., "The Next Generation Video Publishing System", Apr. 11, 2007, http://www.movenetworks.com/wp-content/uploads/move-networks-publishing-system.pdf.
ON2 Technologies, Inc.,, "TrueMotion VP7 Video Codec"*White Paper*, Document Version 1.0, Jan. 10, 2005, (13 pages).

Pathan, Al-Mukaddim , et al., "A Taxonomy and Survey of Content Delivery Networks", *Australia*, Feb. 2007. Available at http://www.gridbus.org/reports/CDN-Taxonomy.pdf.
Puri, Rohit , et al., "Multiple Description Source Coding Using Forward Error Correction Codes", Oct. 1999, 5 pages, Department of Electrical Engineering and Computer Science, University of California, Berkeley, California.
Wicker, Stephen B., "Error Control Systems for Digital Communication and Storage", Prentice-Hall, Inc., New Jersey, USA, 1995, Parts 1-6.
Office Action for U.S. Appl. No. 11/737,669, Mailed Jul. 24, 2009, 19 pages.
Final Office Action for U.S. Appl. No. 11/737,669, Mailed Mar. 5, 2010, 32 pages.
Office Action for U.S. Appl. No. 11/834,548, Mailed Jun. 28, 2010, 20 pages.
United States Patent and Trademark Office, Office Action for U.S. Appl. No. 12/906,940, dated Jun. 6, 2012.
USPTO "International Search Report" mailed Dec. 12, 2008; International Appln. No. PCT/US2008/061035, filed Apr. 21, 2008.
Australian Government "Examiners First Report" dated Oct. 17, 2011; Australian Patent Appln. No. 2011213730.
Korean Intellectual Property Office "Official Notice of Preliminary Rejection" issued Jul. 28, 2011; Korean Patent Appln. No. 10-2006-7025274.
Japan Patent Office "Notice of Rejection Ground" mailed Apr. 26, 2011; Japanese Patent Appln. No. 2007-511070.
Fujisawa, Hiroshi et al. "Implementation of Efficient Access Mechanism for Multiple Mirror-Servers" IPSJ SIG Technical Report, vol. 2004, No. 9 (2004-DPS-116), Jan. 30, 2004, Information Processing Society of Japan, pp. 37-42.
Kozamernik, Franc "Media Streaming Over the Internet—An Over of Delivery Technologies" EBU Technical Review, Oct. 2002.
USPTO "Fnial Office Action" mailed Mar. 17, 2011; U.S. Appl. No. 11/834,548, filed Mar. 17, 2011.
USPTO "Examiner's Answer" mailed Feb. 16, 2011; U.S. Appl. No. 11/116,783, filed Apr. 28, 2005.
Major, R. Drew et al. "Reply Brief" filed Apr. 18, 2011; U.S. Appl. No. 11/116,783, filed Apr. 28, 2005.
Liu, Jiangchuan et al. "Adaptive Video Multicast Over the Internet" IEEE Computer Society, 2003.
Rejaie, Reza et al. "Architectural Considerations for Playback of Quality Adaptive Video Over the Internet" University of Southern California, Information Sciences Institute, 1998.
Roy, Sumit et al. "A System Architecture for Managing Mobile Streaming Media Services" Streaming Media Systems Group, Hewlett-Packard Laboratories, 2003.
Xu, Dongyan et al. "On Peer-to-Peer Media Streaming" Department of Computer Sciences, Purdue University, 2002.
Lienhart, Rainer et al. "Challenges in Distributed Video Management and Delivery" Intel Corporation, EECS Dept., UC Berkeley, 2000-2002.
Guo, Yang "DirectStream: A Directory-Based Peer-To-Peer Video Streaming Service" LexisNexis, Elsevier B.V. 2007.
Zhang, Xinyan et al. "CoolStreaming/DONet: A Data-Driven Overlay Network for Peer-to-Peer Live Media Streaming" IEEE 2005.
Japanese Patent Office, "Final Office Action" mailed Feb. 28, 2012; Japanese Appln. No. 2007-511070.
"The meaning of performance factor—English-Japanese Weblio Dictionary", [online], Feb. 24, 2012, [searched on Feb. 24, 2012], the Internet <URL:http://ejje.weblio.jp/content/performance+factor>.
Tsuru, et al., "Recent evolution of the Internet measurement and inference techniques", IEICE Technical Report, vol. 103, No. 123, pp. 37-42, Jun. 12, 2003.
USPTO "Non-Final Office Action" mailed Dec. 17, 2012 for U.S. Appl. No. 13/617,114, filed Sep. 14, 2012.
USPTO "Notice of Allowance" mailed Nov. 14, 2012 for U.S. Appl. No. 12/906,940, filed Oct. 18, 2010.
Japanese Patent Office "Interrogation" mailed Nov. 6, 2012 for Japanese Patent Appln. No. 2007-511070.
USPTO "Non-Final Office Action" mailed Nov. 23, 2012 for U.S. Appl. No. 11/834,548, filed Aug. 6, 2007.

* cited by examiner

SYSTEM AND METHOD OF MINIMIZING NETWORK BANDWIDTH RETRIEVED FROM AN EXTERNAL NETWORK

CLAIM OF PRIORITY

This is a continuation-in-part of United States patent application having Publication Number 2005/0262257, entitled "APPARATUS, SYSTEM AND METHOD FOR ADAPTIVE-RATE SHIFTING OF STREAMING CONTENT", having Ser. No. 11/116,783 and being filed on Apr. 28, 2005; and U.S. patent application Ser. No. 11/673,483, entitled "APPARATUS, SYSTEM, AND METHOD FOR MULTI-BITRATE CONTEST STREAMING" filed on Feb. 9, 2007; U.S. patent application Ser. No. 11/834,548, entitled "APPARATUS, SYSTEM, AND METHOD FOR MULTI-BITRATE CONTENT STREAMING" filed on Aug. 6, 2007; U.S. patent application Ser. No. 11/737,669, entitled "APPARATUS, SYSTEM, AND METHOD FOR RESILIENT CONTENT ACQUISITION" filed on Apr. 19, 2007.

BACKGROUND

The Internet is becoming a primary method for distributing media files and other information to end users. It is currently possible to download music, video, games, and other multimedia information to computers, cell phones, and virtually any network capable device.

Streaming of data files or "streaming media" refers to technology that delivers sequential content at a rate sufficient to present the media to a user at the originally anticipated playback speed without significant interruption. Streamed data may be stored in memory until the data is played back and then subsequently deleted after a defined time period has passed. In most streaming systems, the user is able to start viewing the requested content without waiting for the entire media file to completely download. However, the audio/video quality that can be received for a streaming presentation is largely constrained by the available bandwidth of the network connection.

Streaming offers the advantage of immediate access to the content but tends to sacrifice quality in order to maintain playback frame speed within the constraints of the available bandwidth. Network failures or congestion also impact streaming content. Streaming may be used to deliver content on demand from previously recorded broadcasts or content from live broadcasts.

At least three basic challenges exist with regard to data streaming over a network that has a varying amount of data loss (e.g., the Internet). The first challenge is reliability. Many streaming solutions use a TCP connection or "virtual circuit" for transmitting data. A TCP connection provides a guaranteed delivery mechanism so that data sent from one endpoint will be delivered to the destination, even if portions are lost and retransmitted. When a network adapter detects delays or losses in a TCP connection, the adapter "backs off" from transmission attempts for a moment and then gradually resumes the original transmission pace. This behavior is an attempt to alleviate the perceived congestion.

The second challenge to data transport is maintaining sufficient throughput. Throughput refers to how much of the user's available bandwidth is used for delivery of the content stream. When a TCP connection is suffering reliability problems, then a decrease in bandwidth utilization can result. Competition among clients for a fixed amount of available bandwidth may also decrease the throughput each client receives.

The third challenge is latency. Latency is a measure of the time interval between when a client's request is issued and the response data begins to arrive at the client. This metric is affected by the network connection's reliability and efficiency and the processing time required by the origin server to prepare the response.

DETAILED DESCRIPTION

Figure 1:
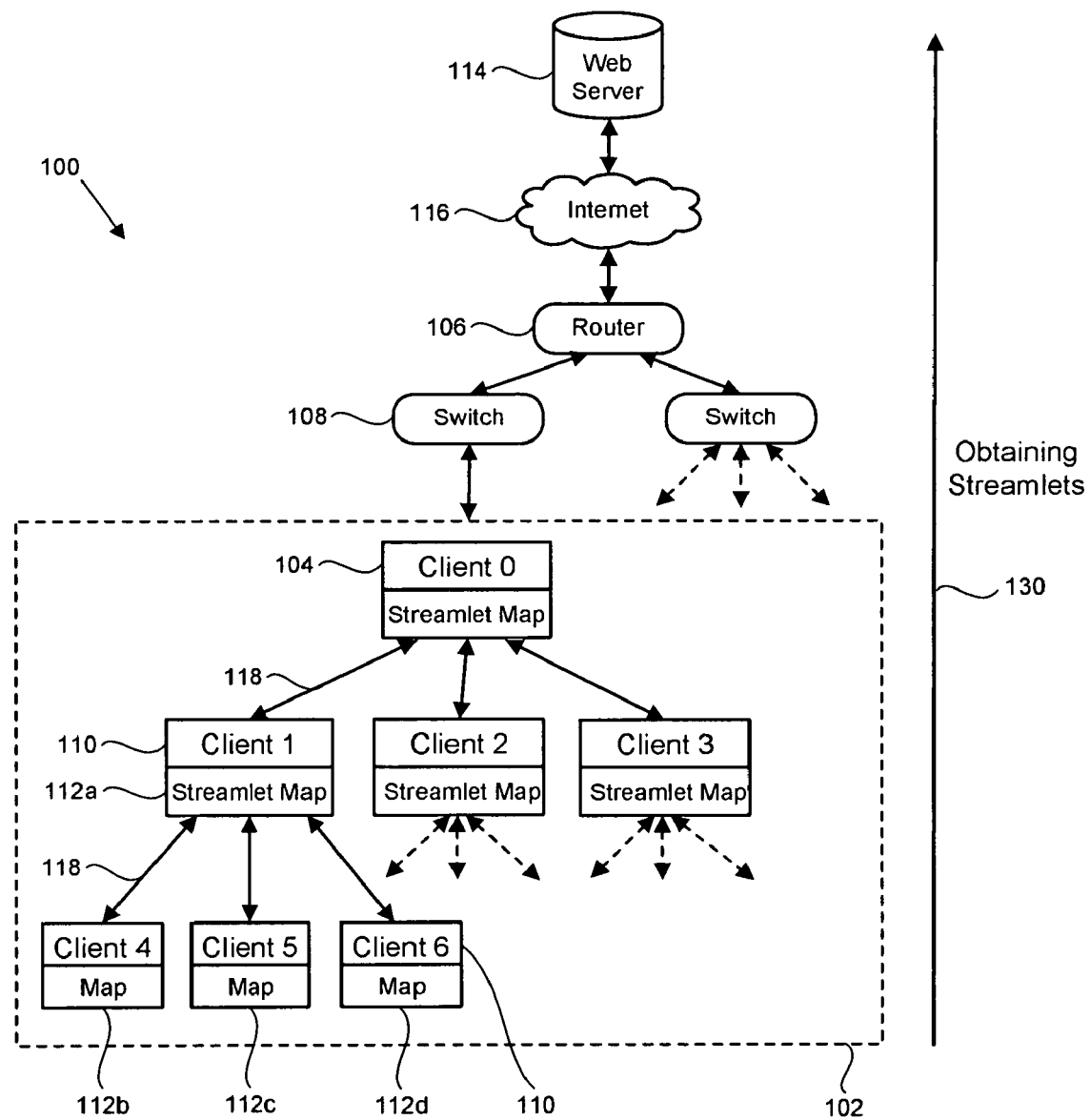
FIG. 1 is a block diagram illustrating an embodiment of a system for minimizing video network bandwidth retrieved from an external network connection.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Some of the challenges faced in obtaining data from an external network can be mitigated when multiple clients that are using the same data stream or same content are located together on a local network. This allows the clients and related media players to make requests to peer clients for locally cached data packets. When data stream packets are obtained from within the local network, this avoids the latency in making requests to an external network or server.

A system and method are provided for minimizing video network bandwidth retrieved over an external network connection, as illustrated in FIG. 1. The system can include a local area network 100 containing a plurality of clients 104, 110 having local streamlets or media data blocks. The local streamlets can be stored in an electronic memory, disk cache, or another storage location accessible by the client. The clients in the local network can also be in communication with the external network using switches 108 and routers 106. Examples of external networks can be the Internet 116, a wide area network, or another type of network. In contrast a local area network (LAN) is a computer network covering a smaller geographic area, like an office, single building, or group of buildings that are geographically close (e.g. a school or business campus).

The clients can be organized into a hierarchical structure using hierarchical links 118. Each client can have a parent with the exception of the root. The number of children that a parent has can be anywhere from two clients up to a large pre-defined number of clients. In certain embodiments, the number of children clients may be limited by the maximum number connections the parent can support with other clients before adversely affecting the parent's overall performance and/or playback performance. However, two to six clients may be sufficient in practice. The methods for organizing the client hierarchy will be discussed in more detail later in this disclosure.

Each client 110 can include a media player or video player that has local streamlets. The media players may be implemented as software objects (e.g., plug-ins) in a web page and web browser. Alternatively, the media player can be standalone client software that executes on the client operating system platform. These media players can include a media output frame where media is displayed for viewing by an end user on a display and an audio output can also be generated. Each media player is configured to have at least one media data stream and a portion of that media data stream may be supplied over the external network. The media data stream may use one or more TCP connections or other type of transport protocols that can be used over a network.

Each client may have a profile for a media player that defines a plurality of data rate levels for which pre-processed media data blocks or streamlets can be requested to provide smooth media transfer at the client's available bandwidth. Streamlets are data blocks containing frames of media data that are compressed and optimized for specific external network data transfer bandwidths. This allows a streaming media server to have data blocks or streamlets that match the data rate levels in the media player profile. When larger amounts of bandwidth are available, then higher quality streamlets can be requested. Conversely, when smaller amounts of bandwidth are provided, then lower quality streamlets may be requested. In other words, streamlets and profiles can have a combination of attributes including video bit-rate, audio bit-rate, stage size, frames per-second. So each streamlet or video block is encoded using multiple profiles. Each profile is configured to access the fully encoded stream broken into n-second chunks called streamlets and bit-rate is the primary determinant of streamlet size. The media being played may be a video stream.

The specific content being played by each media player has an associated set of 1 to N possible stream data rates or profile levels based on different encoding profiles. Individual entries in the media player's profiles are assigned a profile identifier in order of ascending bit rate. Thus, a media player can request the streamlets at a specific quality level that matches the network bandwidth allocated to the media player and/or the client computer capability to decode the streamlets. Obtaining streamlets at varying quality levels in response to network bandwidth variation allows the media player to play as smoothly as possible with the bandwidth available. When a change in the streamlet's bandwidth is requested, then a different quality of video frames or streamlet will be sent to the media player. For example, the different profiles that can be switched between may be: 2000 Kbs, 1500 Kbs, 1000 Kbs, 500 Kbs and 300 Kbs. Further detailed regarding the operation of a system that can adaptively deliver streamlets at varying quality levels is described in U.S. Patent Office Publication Number 2005/0262257, entitled "APPARATUS, SYSTEM AND METHOD FOR ADAPTIVE-RATE SHIFTING OF STREAMING CONTENT", having Ser. No. 11/116,783 and being filed on Apr. 28, 2005; and U.S. patent application Ser. No. 11/673,483, entitled "APPARATUS, SYSTEM, AND METHOD FOR MULTI-BITRATE CONTEST STREAMING" filed on Feb. 9, 2007; U.S. patent application Ser. No. 11/834,548, entitled "APPARATUS, SYSTEM, AND METHOD FOR MULTI-BITRATE CONTENT STREAMING" filed on Aug. 6, 2007; U.S. patent application Ser. No. 11/737,669, entitled "APPARATUS, SYSTEM, AND METHOD FOR RESILIENT CONTENT ACQUISITION" filed on Apr. 19, 2007, which are herein incorporated by reference in their entirety.

Referring again to FIG. 1, a metadata map 112a-d or streamlet location map can be contained in each of the plurality of clients. The metadata map is configured to list the locations of local streamlets that are stored by media clients in the hierarchical structure. This allows clients to know which streamlets may be available from clients within the local area network for retrieval.

From the perspective of a streamlet-requesting client, streamlets repositories are virtually organized into multiple levels according to their closeness to the client. As demonstrated in FIG. 1, the local cache at the requesting client serves as the first (or lowest) level for finding the local streamlet, and the arrow 130 illustrates the increasing distance of the streamlet repositories that can be accessed. Caches at peer clients in the same LAN constitute the second level of investigation for obtaining local streamlets. The streamlet's origin web server that is accessed using the Internet forms the highest level, which may also be the lowest priority location for retrieving a streamlet. The streamlet-locating process follows a bottom-up policy, which reduces the bandwidth consumption from the LAN gateway and web server.

Clients can share streamlets between each other in a self-maintained hierarchal tree topology. Each client may simultaneously maintain multiple TCP connections with peers for streamlet exchanges. The clients utilize software logic to manage the relationships with other clients. This system and method uses a client-oriented approach, in which the streamlet-requesting client is the driving force in propagating streamlet location information, connecting to streamlet inventories, and maintaining connections. A client is configured to view the accessible peers in the same LAN or web servers across the Internet as potential resources of streamlets. In one embodiment, these requests for streamlets do not differentiate between video on demand (VOD) and "live" content handling. An alternative embodiment may use priority mechanisms treat the requests for different types of streamlets in different ways. For example, "live" content may be configured to request more streamlets from local clients because other local clients are likely to have that live content, whereas "on demand" clients may have instructions to request more streamlets from web servers. In either case, the focus is locating and retrieving the desired streamlets in a fast, efficient, and reliable manner.

Metadata Exchange

The mechanisms that clients use to identify and share streamlets between each other will now be discussed in more detail. The clients can connect to each other to form a hierarchical tree topology. Using the hierarchical tree, the clients can exchange metadata messages. While a hierarchical tree is one possible organization structure, other client relationship structures can also be used. For example, the client can be organized in a ring, mesh, star, or another network topology configuration. Then, using the streamlet location information contained in the metadata, the clients may connect to each other to download streamlets as needed. These two types of connections are decoupled from each other in the sense that a client may connect to different sets of peers for these two purposes.

Before determining which other clients to request desired streamlets from, a client needs to build a map of the streamlet layout in the local network for the desired content. A streamlet map may be content specific, which means it can contain streamlet layout information for a specific media stream that contains only one type of content. Alternatively, the streamlet map may provide a global map, which means that the map can contain streamlet layout information for all media streams available in the hierarchical tree of clients.

A client may start the process of collecting the information for streamlet layout when it broadcasts to the local network that wishes to form a hierarchal tree with other clients, and optionally, that a specific content is desired. The client may specify the identity of the desired content and its own address and port in the broadcast message. Once a connection has been made, this connection can be used to transfer the metadata that is contained in the responder's own cache and the knowledge of streamlet availability at other clients that the responder has learned over time. The content-requesting client can aggregate the metadata received from the responses and form a view of streamlet layout in the local network.

The number of TCP connections for metadata-exchange increases as a token holding client responds to content request broadcasts. If the streamlet map is content-specific, then a client receiving a broadcast first checks to see if the broadcast request is for the same content that the client is using. If so, the client may respond with a UDP packet to the requesting client that contains its depth in the hierarchical tree. The requesting client may receive multiple responses but only choose one with which to form the metadata update relationship, such as the one with the least depth in the hierarchical tree. Responses from other responders may then be dropped.

Since broadcast messages that are used to join the hierarchy will be relatively small in size (e.g., contained in a single packet), the initial broadcast messages are generally not large enough to contain the metadata of a joining node. As discussed previously, the joining node can select a token holding node to connect to and the client will accept the connection. The joining node can send all the metadata from the joining node to the token holding node over a normal stream connection between the nodes. Then the token holding node can send all of its metadata to the joining node to complete the peering process.

Once the connections are established, the metadata may be exchanged through the linked structure of nodes or hierarchical tree using a propagation method where each client node sends its metadata regarding streamlets to every other client node with which the client node has a connection link. In other words, each client node will be configured to periodically send its own metadata and any other metadata that it has collected to its parent node and each of its children nodes. This is a fast and effective way to propagate the metadata information. The periodic updates may take place every few seconds or every minute or more. In one configuration, the metadata sent every period may be just the updates to the metadata and then when the metadata is flushed selected updates may send a full version of all the metadata.

The metadata may be highly optimized to ensure that the startup metadata transfers remain reasonable in size. For example, each streamlet record may result in just several bytes of metadata transfer. After the initial full exchange of metadata, all subsequent messages may be just updates to the original transfer. In other words, later metadata transfers may have the changes to the metadata or deltas (compact add or remove messages for individual streamlets).

After the metadata exchange process, a parent-child relationship for metadata reports is built with the responding client acting as the parent. The parent client increases the value stored representing its own number of TCP connections for metadata updates by one. When this number reaches a cap value, then the parent client can stop responding to future broadcasts. The method that the client can use to determine how to pass tokens between the peers will be discussed later. In one embodiment, clients receiving the same media stream (e.g., watching the same video program) constitute a tree topology for metadata exchange with the first client as the root. Alternatively, all known clients watching any media stream may constitute a tree topology with the earliest responding client in the tree as root.

In one embodiment, all the nodes in the hierarchical tree share a number ("nonce") to detect and avoid creating cycles in the hierarchal tree. The nonce may be generated independently by the root using a pre-defined method or obtained some other way. The root of the tree periodically broadcasts to search for other trees in the network, if any. If a client that is part of the same hierarchical tree responds to the root, the client can be identified as being part of the same tree because it includes the nonce in the response. The root compares all responses received and discards any that contain the same nonce as the root. This allows the root to filter out responses from its own tree. If the root were to connect to a descendant, it would form a cycle. Checking the nonce allows the root to identify and filter out communications to descendants.

The benefit of the root broadcasting for other trees is that all distinct trees on the same LAN become consolidated over time. In fact, each node uses the same mechanism to join the tree structure, and a new node is just a trivial root. It also means there is no special handling necessary when a parent exits, because each child of the exiting parent simply becomes a root and begins to consolidate with other trees.

Tokens

For scalability purposes, only a limited number of clients have a token which allows those clients to respond to a content-request broadcast. The use of tokens can limit the number of responses in a distributed manner and assist in balancing the number of connections for each node in the tree.

Figure 2:
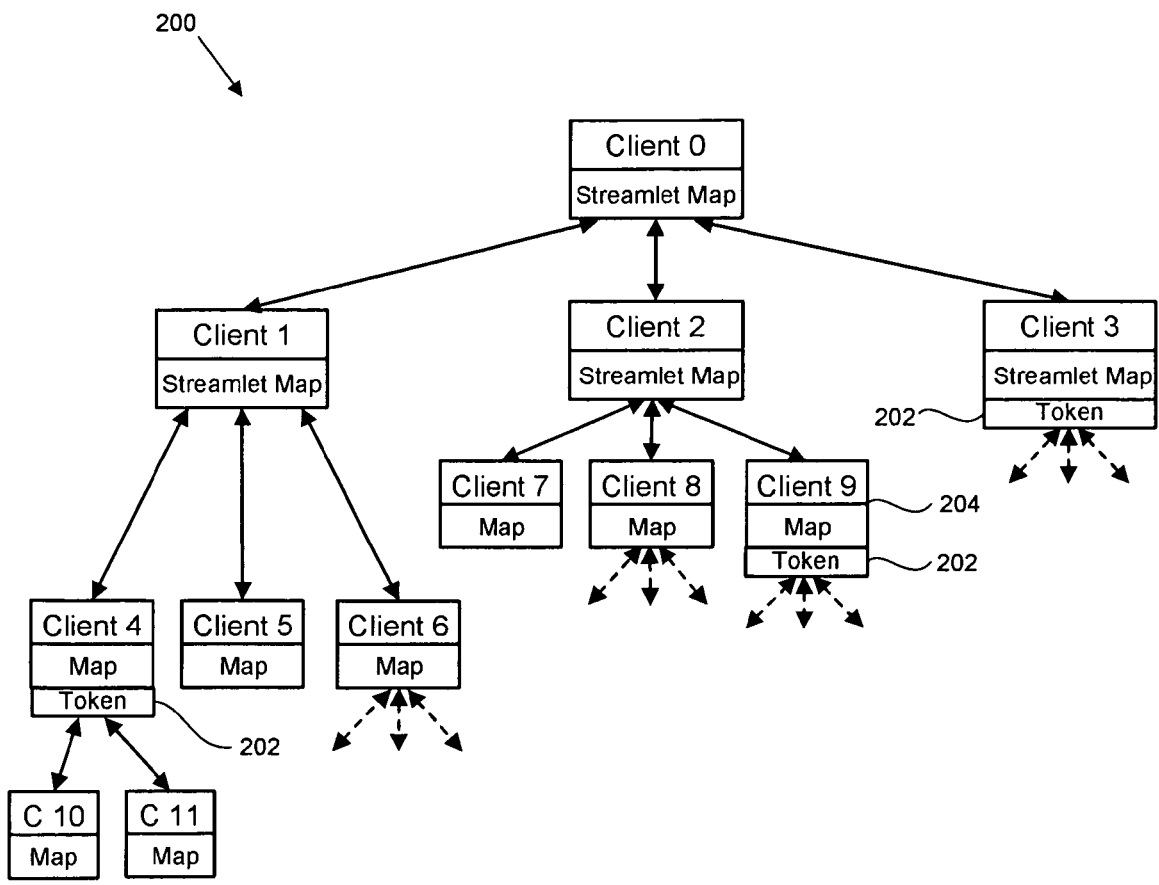
FIG. 2 is a block diagram illustrating an embodiment of a system for minimizing video network bandwidth retrieved over an external network connection using tokens.

Referring now to FIG. 2, a plurality of tokens 202 can be assigned to clients 204 in the hierarchical structure 200. Each client in the hierarchy is capable of having a token (e.g., token) when the conditions that will be discussed later dictate the transfer of the token. The number of tokens can be less than the plurality of clients in the hierarchical structure. This is because the tokens are used for: 1) balancing the hierarchy tree and 2) reducing the volume of network broadcasts, which in turn reduces the overall network congestion.

The plurality of tokens can define which clients will respond when another client wants to enter the hierarchy and the clients can be attached to by clients entering the hierarchy. The clients entering the hierarchy may be either new clients that have just started a media player or the client may be an existing client that desires to re-attach to the tree.

Tokens are permissions granted to clients to enable replying to a broadcast request for a new connection. Tokens may be content specific such that each token is associated with a specific content type and is only effective for that content type. Different content streams may each have their own corresponding sets of tokens. A content type can be a video program, audio program or another media stream. Alternatively, global tokens can be used that are not content specific but are used for any streamlets received by media clients in the same network.

The first client that starts watching a content stream in the local network creates a number of tokens, as determined by the configuration. The tokens may be content specific or they may global tokens. This initial client will realize that it is the first one in the local network if no other clients respond the connection-request broadcast. Every other client watching a media content stream will later attach to the tree with the first client as the root. The number of initial tokens created at the first client is subject to the maximum number of metadata-exchange connections the root can support for transferring mapping information exchange connections (or metadata maps). By way of example, three to six tokens is a number of tokens and child nodes for each parent that is a useful number for the system. However, a larger number of tokens can be used if desired, but the number of tokens should be significantly smaller than the maximum number of nodes on the LAN to be effective.

Figure 3:
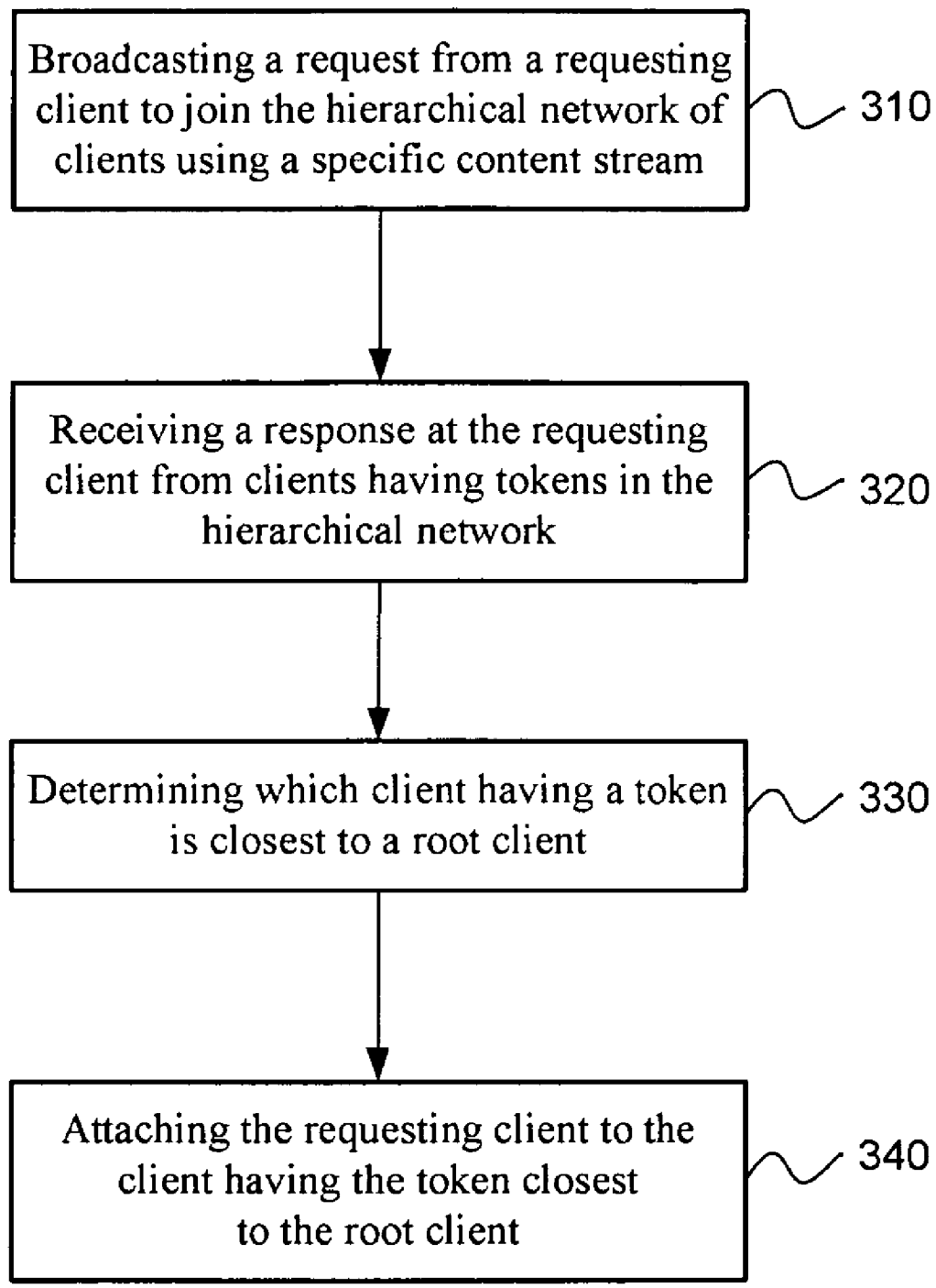
FIG. 3 is a flow chart illustrating a method of minimizing video network bandwidth by connecting to a hierarchical tree.

FIG. 3 illustrates an embodiment of a method of minimizing media bandwidth retrieved from a local network using a hierarchical tree. A summary of how to build and maintain the tree will be discussed first followed by a more detailed discussion of those functions. The method can include the operation of broadcasting a request from a requesting client to join the hierarchical tree of clients, optionally using a specific content stream 310. The broadcast request will be received by all the clients.

A response can be received by the requesting client from the clients with tokens in the hierarchical network 320. In order to limit the number of network broadcasts and to maintain the hierarchical tree in an orderly configuration, only the clients with tokens are allowed to respond to general requests to join the tree. The requesting node may then determine which client is closest to a root client 330. The requesting node can tell which client with a token is highest in the tree because the client can send its depth in the response to the broadcast. The requesting client can then attach to the client with a token that is closest to the root client 340. This helps keep the tree as shallow as possible. When the requesting client sends out a broadcast to join the hierarchical network but no other clients respond, then the requesting client can be designated as the root of the hierarchical tree.

Additional details related to maintaining the tree will now be discussed. Clients maintain the balance of the tree by accepting new clients at a client with a token that is highest in the tree and by transferring tokens from parent clients to child clients. Since only clients with token accept new clients into the tree, controlling token transfer can effectively manage the overall topology of the tree.

The root of the tree periodically notifies its clients of the current nonce, their depth, and the number of tokens allocated to each client. On receiving the periodic message from the root, each client records its current depth in the tree, the current nonce, and the number of tokens it has received. Each client then passes the message onto its own clients. The periodic root messages ensure that all clients receive regular updates of the depth, a nonce to use in responding to clients, and information about whether they are token holders with the capability to respond to the broadcast messages.

The periodic root messages distribute a set number of tokens down the tree until all the tokens have been allocated to clients. Every few seconds, the root of the hierarchy allocates a number of tokens for the whole tree and the old tokens are deleted. For example, six tokens may be allocated every one to three (or more) seconds. Each node in the tree then follows the same recursive procedure when receiving a token in order to entirely refresh to tokens in the tree each allocation cycle. This allocation procedure is described below.

First, when the node or client has any open slots available for a child connection, the node keeps a token for itself. This is because each node has a set number of potential slots for child connections (e.g. two to six). The node then splits the remaining tokens evenly among every child connection and passes them down. In the case where an uneven number of tokens exist based on the available children, then any odd tokens can also be distributed randomly. When there are fewer tokens than there are children, the node picks children at random to receive a token.

By way of example, the root node may have two children and zero grandchildren. Six tokens can be allocated at the start of the refresh period. The root will keep one token for itself and then pass three to the first child and two to the second child. Determining which client should receive the most tokens in this case is done on a random basis.

In another example, the root node has six children, and the leftmost child also has six children. The root can allocate six tokens, and saves zero for itself (since all the root slots are in use), and passes one token to each child node. All of the children except the leftmost child client have at least one open slot, so they keep a token for themselves. The leftmost child is fully in use, so it picks one of its six children at random and sends the token to that child.

Choosing a random child to receive a token ensures that every node has a uniform chance to fill its open slots and several chances each minute to fill open slots on average. It is possible for a random choice to send a token down a branch that is already filled out down to the leaf level. However, this event is mitigated because 1) the tokens will refresh every few seconds and 2) the attaching node will have a number of other token holding nodes to choose from and the attaching node will select to attach to a response node with the highest level in the tree.

This method ensures that tokens are allocated to nodes higher in the tree, assisting with keeping the tree shallow. It also ensures that the unexpected loss of a token will only result in a temporary imbalance in the number of tokens until the next periodic message from the root refreshes the client token counts.

Clients can join and leave the tree at anytime and the structure of the metadata exchange tree can be modified in response to topology changes. A client can detect changes in the availability of its parent and children clients from the status of the corresponding network connections.

When a client disconnects (intentionally or unintentionally), the children of the disconnecting client, if any, become trivial roots and broadcast to the local network seeking to reattach to the tree at some other client. If the children of a disconnecting node have their own children, the connection relationship between them remains unchanged.

In case of a link outage to a child, the parent client sends a metadata message to all remaining connections indicating the location of the client that exited so that other clients remove all metadata corresponding with the client that exited. If the child held a token, the aggregate number of tokens is temporarily less than the hierarchy started with until the next periodic refresh from the root.

A user may also stop or pause the ongoing media stream playback in a client at any time. When a client exits due to a pause, stop or quit state, the children and parent of the client handle the quit state in the same manner as when the connection unexpectedly closes.

A special case related to these reconnection policies is when a level-one client broadcasts and tries to reattach to the tree. Before connecting to a client, the broadcasting client should check to determine whether broadcasts are received from other level one clients. If all level one clients are broadcasting, the client with the lowest IP address becomes the root of the new tree, and others attach to the clients of the new tree.

One result of these reattachment policies is faster failure recovery. Because the network is dynamic, the use of straightforward and fast reattachment policies makes the overall system more efficient and less prone to serious breakdowns.

The described system and method provide a mechanism for acquiring streamlets that are currently cached by the media players in clients belonging to the same local area network (LAN). Finding local streamlets efficiently helps support peer-to-peer streamlet sharing in an efficient, dynamic, and extensible manner. The streamlet sharing can help in minimizing gateway bandwidth consumption. This is because a client only requests streamlets from a web server located on the Internet when the streamlets are not already cached in the LAN. When the total bandwidth requested from a media provider's web server is reduced, this can reduce the cost of providing media streams to end users. In other words, creators and providers of streaming media, such as video content, pay for the bandwidth consumed by end users. When the consumed bandwidth is reduced, then the media provider saves money.

Another result of this bandwidth reduction system and method is that redundant requests for streamlets from a LAN can be avoided. If a streamlet has already been retrieved from a remote web server then a peer client can request the local streamlet from another peer without consuming bandwidth from the external network. When multiple clients desire the same set of streamlets that are not cached in the LAN, the system can be configured so that only one client will request the streamlets from an external web server.

The present system and method is also very scalable. The system can adapt as more functional clients are added without changing the system modularity. Even if the hierarchical tree becomes very large, this system is still able to provide access to local streamlets effectively and without overburdening the local network.

The present system can also prevent the occurrence of an overwhelmed node. For load balancing, clients store multiple map locations for each available streamlet with a specific type of content and randomize their retrieval choice among the available options. This leads to a more uniform request load among nodes having the same streamlet. If a single client is overloaded with streamlet requests, then the client may reject some requests until the client is able to handle more requests.

Streamlet Exchange

In streamlet exchange, clients acquire actual streamlets from repositories based on streamlet layout information collected during the metadata exchange phase. The streamlet exchange is separate from the metadata exchange in the sense that a client may maintain a separate set of network connections for each purpose. Clients can exchange metadata in a tree topology but acquire streamlets using direct requests to clients that are believed to have the desired streamlet. However, these two processes correlate to each other because a change in one process directly affects the behavior or status of the other. Metadata exchanges may happen in these circumstances:

1. Initial metadata exchange. An initial exchange happens after a client joins the hierarchical tree. The responding client transmits its streamlet map to the joining client, and the joining client replies with the contents of its streamlet map.
2. Routine metadata report. A child client can periodically report its updated streamlet layout information to peers in the tree with which the child has a connection. This reporting includes "add" messages for new content that the client has requested and "remove" messages for content that the client has purged from cache.

For purpose of load balancing, each client may set its own maximum number of simultaneous TCP connections for streamlet sharing. The value of the cap is subject to change according to hardware capability, hardware throughput, and the sustainable network bandwidth for the client. Due to the dynamic nature of these two factors, the cap value can be adjusted accordingly. The CPU load may vary over time, and the obtainable throughput may also be inversely proportional to the number of clients competing for the same available bandwidth. Once the number of TCP connections reaches the cap value, a client becomes saturated and rejects streamlet requests until connections are below the cap value.

Clients generally use a best-effort strategy in requesting streamlets from peers in a local network. Even though a peer appears to have the desired streamlets as reported by metadata, the peer may still reject the streamlet request for several reasons. The specific peer may have become saturated with requests or the desired streamlet may have already been dumped out of the cache before the metadata removal message reached the content requestor. The requesting client then has to contact an alternative repository, which can eventually be the origin web server as the last resort.

The initial transfer of metadata on connection to the hierarchal tree gives an incoming client a complete map of all streamlets on the network. In the case where responding clients include their full knowledge of the metadata when they accept new connections, the amount of data for such responses may constitute a significant percentage (e.g., above 20%) of the total data transmitted under a high transient rate setting (e.g., over 60% quit rate).

There are a number of embodiments that can help reduce the percentage of metadata that is transferred across the network in an initial metadata transfer. In one embodiment, the clients flush their buffers at selected intervals. Otherwise, the cumulative size of metadata transmitted becomes a significant overhead. If clients flush their local cache regularly, this communication overhead can be effectively reduced.

In another configuration, the amount of metadata that a responding client sends to a connecting client can be limited. Rather than sending the metadata file to a requesting client, the clients can include just a subset of metadata that best matches the content ID that may be specified in the connection request broadcast or a subset of the responding client's metadata that contains the most recently updated metadata.

Priority Policy Rule

Figure 4:
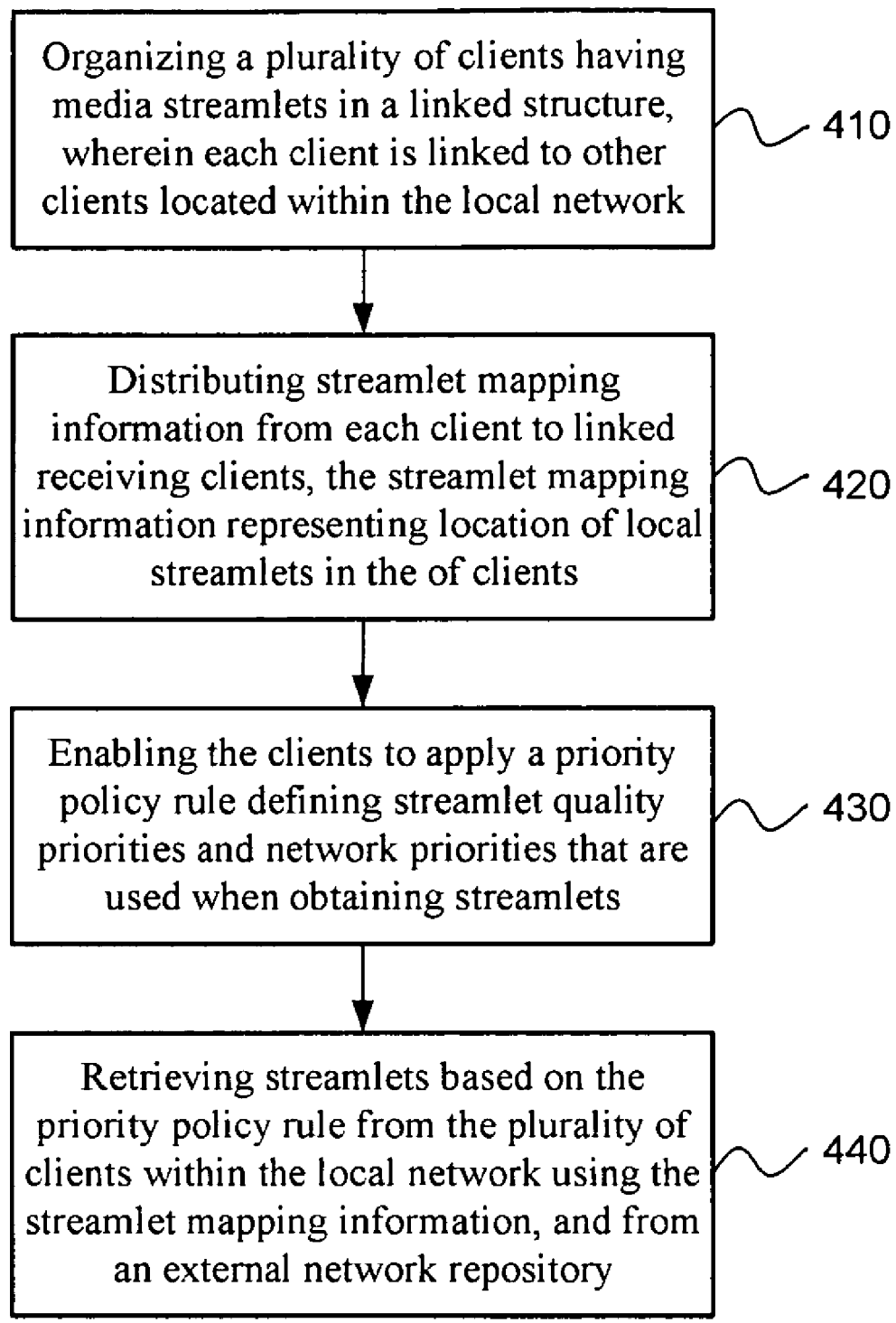
FIG. 4 is a flow chart illustrating an embodiment of a method of applying a priority policy rule defining streamlet quality priorities and network priorities.

FIG. 4 illustrates a method of reducing media network bandwidth used from an external network using a priority policy rule. The plurality of clients can be organized in a linked structure, the clients having media streamlets, as in block 410. Each client is also linked to at least one other client located within the local network. Typically the client will be linked to a parent client and one or more child clients (unless the client is a leaf node).

Streamlet mapping information can be distributed from each client to linked receiving clients, as in block 420. The streamlet mapping information represents the location of local streamlets stored by the plurality of clients. Each sending client will send the mapping information or metadata information to all the clients with which the sending client has an existing link.

The clients are able to apply a priority policy rule defining streamlet quality priorities and network priorities that are used when obtaining streamlets for media playback, as in block 430. The media streamlets can be retrieved based on the priority policy rule from the plurality of clients, as in block 440. The quality level of the streamlets will be selected based on the hardware speed of the client machine and the external network connection. Then the client will make an attempt to retrieve the streamlets from within the local network using the streamlet mapping information. If no streamlets matching the streamlet quality defined by the streamlet profile are found, then the streamlets will be obtained from an external network repository.

The priority policy rule can be defined in a number of different ways. Some examples of the priority policy rule will now be discussed. In one example, the priority policy rule can be defined to have clients obtain the highest quality streamlets possible with a lowest amount of external network access. In another example, the priority policy rule can be defined to have clients obtain as many local streamlets as possible regardless of streamlet quality in order to minimize external network access. This may mean the media stream is periodically played back at lower qualities to avoid external network access. Another example of the priority policy rule is where the clients are configured to obtain the highest quality streamlets by checking the local network first using the streamlet mapping information and then the external network second.

The priority policy rule may alternatively be defined to retrieve the highest quality streamlets possible based on a client machine's ability to sustainably decode the streamlets and based on a minimum latency threshold of retrieving the packets from local and external networks. In yet another example, the priority policy rule can be defined to retrieve the highest quality streamlets possible based on a comparison of minimum streamlet quality available on the local network and a minimum latency threshold for retrieving the packets from a network. This may mean if latency is high that local streamlets are more likely to get picked, and if latency is low then streamlets are more likely to be retrieved from the external network.

Figure 5:
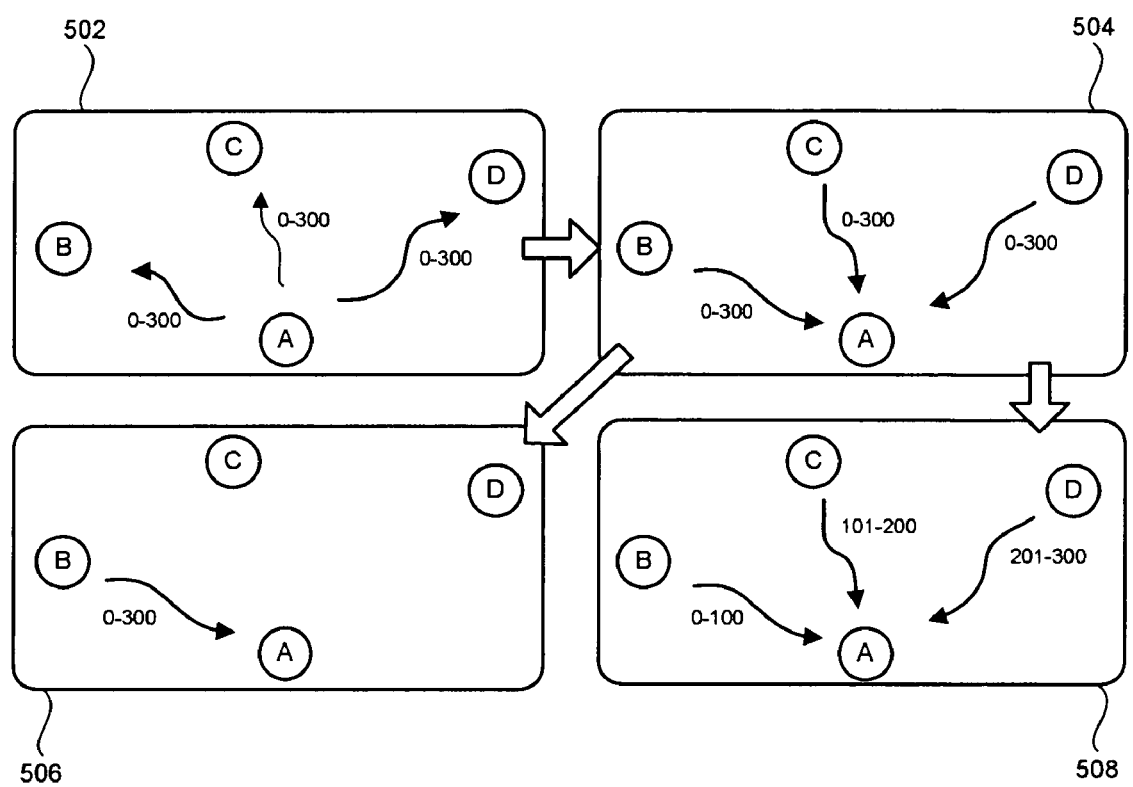
FIG. 5 is block diagram illustrating an embodiment for obtaining streamlets from multiple peers to achieve higher integrated caching rates.

In another embodiment, a client can either receive streamlets from a single peer or from multiple peers in a collective way to achieve a higher integrated caching rate. For example, as demonstrated in FIG. 5, client A queries its cache for streamlets 0 to 300 (502), the client discovers that three peers (B, C, D) have reported availability of streamlets 504. Client A can either retrieve the set of streamlets from a single peer 506, such as client B, or retrieve portions of the streamlets collectively from all three responding peers 508. From the perspective of client A, the caching rate has been tripled in the latter case.

Figure 6:
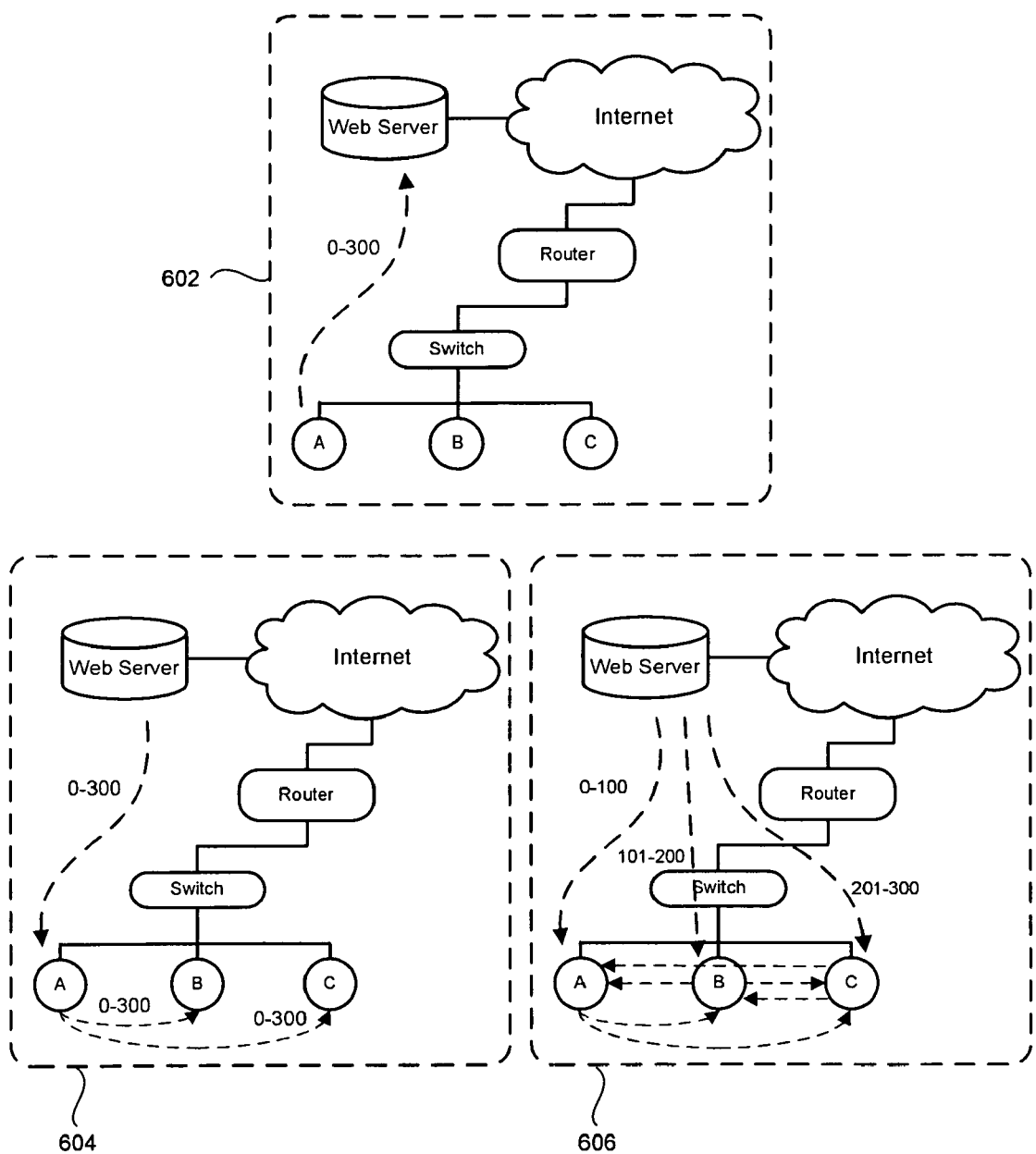
FIG. 6 is a block diagram illustrating the collective requesting of commonly-desired streamlets from an external web server to achieve a higher integrated caching rate.

Clients belonging to the same LAN can collectively request commonly desired streamlets from external web server(s) to achieve a higher integrated caching rate. For example, as shown in FIG. 6, all the clients (A, B, and C) desire streamlets 0-300 which are not present in the LAN. Using an un-integrated method, client A requests streamlets 0-300 from the web server 602 and feeds client B and C later on 604. In contrast, collective streamlet retrieval uses each of the three clients to request a complementary subset of the desired streamlets, and then the clients can feed each other with acquired pieces 606. From the perspective of an individual client, the caching rate has been tripled. In order to maintain the scalability at the web server, clients belonging to a same LAN can set a maximum number for such collective requests to the server.

Figure 7:
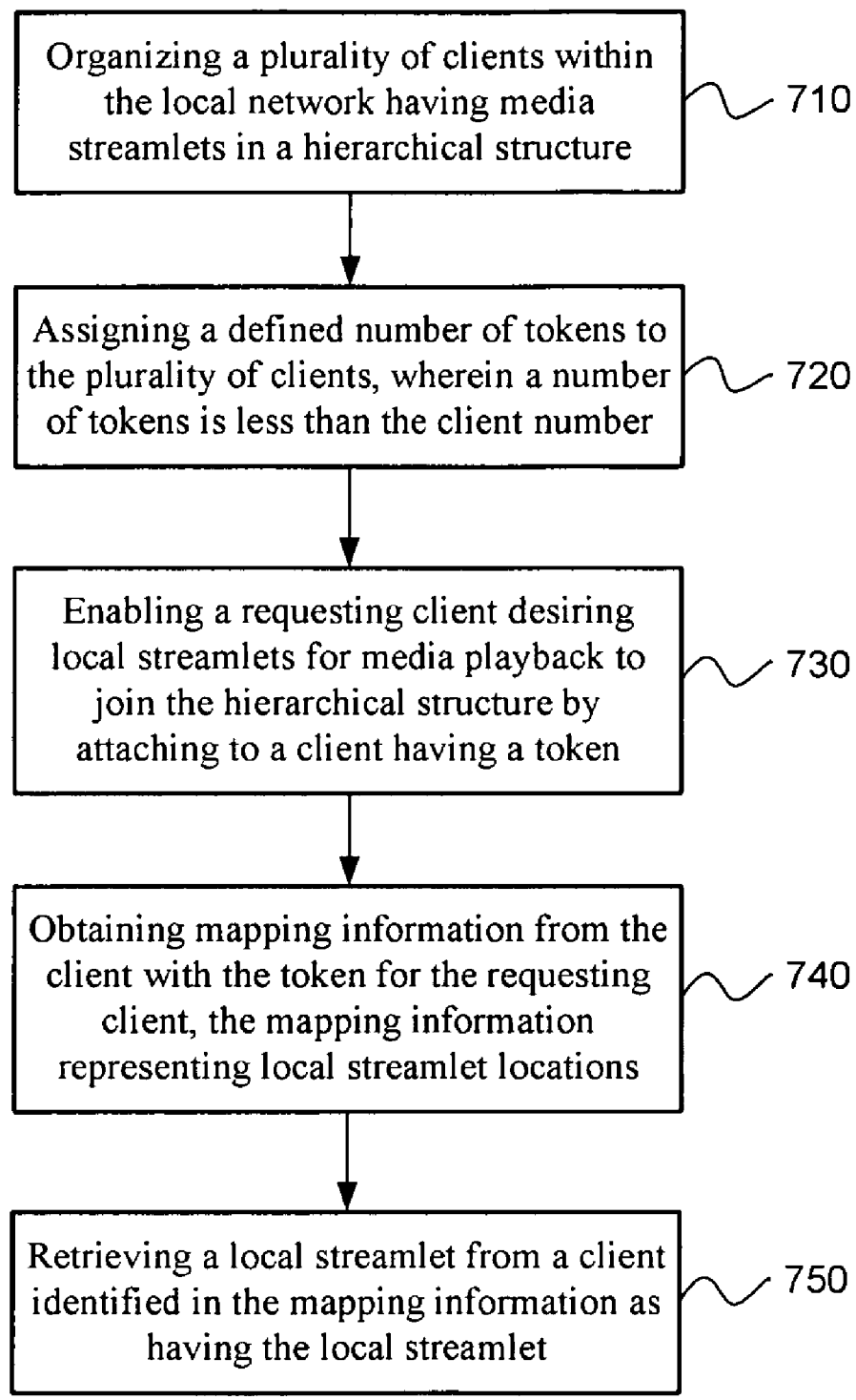
FIG. 7 is a flow chart illustrating a method for minimizing media network bandwidth used from an external network by client peers in a local network.

A summary of a method for minimizing media network bandwidth used from an external network by client peers in a local network will now be described. This method is illustrated by FIG. 7. The method can include the operation of organizing a plurality of clients having media streamlets in a hierarchical structure 710. The clients are located within the local network and can each include a software media player. A defined number of tokens may be assigned to the plurality of clients, and the number of tokens is less than the plurality of clients 720. In some embodiments, the number of tokens may be between three to five tokens but any number of tokens can be used. A requesting client may want to use local streamlets for media playback. Accordingly, the client can join the hierarchical structure by attaching to a client that responded to a join message 730.

Mapping information can be obtained from the client for the requesting client 740. The mapping information represents local streamlet locations as stored by the plurality of clients. When the client does not have the requested mapping information for a local streamlet, the client or parent client can request additional information from other clients with which it is connected.

The local streamlets are stored in the media player cache of a client who is or has been playing the desired media stream or video stream. A local streamlet can be retrieved by the requesting client from a client that is identified in the mapping information as having the local streamlet within the local network 750. When the desired streamlet is not available in the local network, then the streamlet can be requested from a video server via the Internet.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method executable by each of a plurality of clients operating as peers in a local area network to reduce consumption of network bandwidth on an external network during streaming of a media stream obtained from an external network repository, the method comprising:

the client organizing in a linked structure with the other clients, wherein each of the plurality of clients in the linked structure has a different set of media streamlets obtained from the external network repository, and wherein each streamlet is an individually-addressable data file containing an identifiable portion of the media stream having a particular quality, wherein each client is linked to at least one other client and the plurality of linked clients are located within the local network;

each client distributing streamlet mapping information to linked receiving clients, the streamlet mapping information representing location of local media streamlets stored by the plurality of clients;

each client applying a priority policy rule defining streamlet quality priorities and network priorities that are used when obtaining media streamlets for media playback; and during playback of the media stream, retrieving additional media streamlets based on the priority policy rule from the plurality of clients within the local network using the streamlet mapping information if the additional media streamlets are available from clients within the local network, and otherwise obtaining the additional media streamlets from the external network repository.

2. A method as in claim 1, wherein the priority policy rule is defined to have clients obtain the highest quality streamlets possible with a lowest amount of external network access.

3. A method as in claim 1, wherein the priority policy rule is defined to have clients obtain as many local streamlets as possible regardless of streamlet quality in order to minimize external network access.

4. A method as in claim 1, wherein the priority policy rule is defined to have clients obtain the highest quality streamlets by checking the local network first using the streamlet mapping information and then the external network second.

5. A method as in claim 1, wherein the priority policy rule is defined to retrieve the highest quality streamlets possible based on a client machine's ability to sustainably decode the streamlets and based on a minimum latency threshold of retrieving the packets from local and external networks.

6. A method as in claim 1, wherein the priority policy rule is defined to retrieve the highest quality streamlets possible based on a comparison of minimum streamlet quality available on the local network and a minimum latency threshold for retrieving the packets from a network.

7. A method as in claim 1, further comprising linking the media clients in a hierarchical structure.

8. A method as in claim 1, further comprising linking the media clients in a ring structure.

9. A method as in claim 1, wherein the distributing streamlet mapping information further comprises distributing streamlet mapping information that includes the streamlet mapping for the replying client and additional streamlet mapping information received from other linked clients.

10. A method as in claim 1, wherein network priorities define the ordering in which streamlets at defined qualities should be retrieved from clients on the local network and servers on external networks.

11. A method of reducing network bandwidth of an external network consumed by client peers in a local network during streaming of a media stream, comprising:

identifying a plurality of clients having media streamlets, the plurality of clients being located within the local network, wherein each of the media streamlets is an individually-addressable data file containing an identifiable portion of the media stream having a particular quality, wherein a limited number of tokens are assigned to the plurality of clients arranged in a hierarchical structure, and wherein a number of tokens is less than the plurality of clients;

requesting to join the hierarchical structure by a requesting client desiring a local streamlet for media playback;

receiving a response message from a client with a token, the response message containing the depth of the client in the tree and a nonce identifying the tree;

receiving mapping information from the client with the token at the requesting client, wherein the mapping information represents locations of local streamlets stored on each of the plurality of clients;

connecting the requesting client to the hierarchical structure of the plurality of clients; and subsequently obtaining at least one local streamlet of the media stream from a location identified in the mapping information by making a direct request from the requesting client to the client within the local network having the local streamlet.

12. The method as in claim 11, further comprising creating a defined number of tokens for a first client that joins a hierarchal tree.

13. The method as in claim 11, wherein the creating a defined number of tokens for a first client to join a hierarchical content tree, further comprises creating a number of tokens based on a maximum number of mapping information exchange connections that are supportable.

14. The method of claim 11, further comprising retrieving the local streamlet from a client in the local network that is listed in the mapping information as storing the local streamlet.

15. The method of claim 11, further comprising requesting the local streamlet from a video server via the internet when the local streamlet is not available in the mapping information.

16. The method of claim 11, wherein the assigning a limited number of tokens further comprises using two to ten tokens in the hierarchical structure.

17. The method of claim 11, further comprising passing a token from a parent client to child clients by randomly assigning tokens to child clients.

18. The method of claim 11, wherein each of the local streamlets was previously received at one of the plurality of clients on the local area network from an external network repository, and wherein the requesting client obtains the local streamlet from the client on the local area network during playback of the media stream instead of from the external network repository.

19. A system for reducing network bandwidth consumed by a media stream represented by a series of streamlets that are retrieved over an external network connection from an external network repository, comprising:

a plurality of clients each configured to store local copies of streamlets from the series of streamlets representing the media stream, wherein each of the clients is configured to communicate with other clients via a local area network, the local area network being in communication with the external network connection, wherein the plurality of clients is organized into a hierarchical structure having a number of tokens assigned to the clients, wherein the number of tokens is less than the number of clients in the hierarchical structure;

wherein each of the plurality of clients comprises an instance of a media player configured to playback the series of streamlets representing the media stream; and wherein each of the plurality of clients distributes a metadata map configured to list which streamlets are locally stored by the client to thereby allow the media players executing on other clients to identify and retrieve locally-stored streamlets from the other clients in the hierarchical structure instead of the external network repository for decoding during playback of the media stream by the media player.

20. The system as in claim 19, wherein a number of tokens for the hierarchical structure is based on a maximum number of mapping information exchange connections that are supportable.

21. The system of claim 19, wherein the plurality of tokens defines which clients are able to be attached to by clients entering the hierarchy.

22. A method of reducing network bandwidth used from an external network by client peers in a local network during streaming of a media stream represented by a series of media streamlets, wherein each of the series of streamlets is an individually-addressable data file containing an identifiable portion of the media stream, the method comprising:

organizing a plurality of clients in a hierarchical structure within the local network;

obtaining mapping information for a requesting client from at least one other client, the mapping information representing locations of local streamlets from the series of media streamlets that are stored by the at least one other client; and retrieving one of the local streamlets identified in the mapping information from the at least one other client for decoding during playback of the media stream.

23. The method of claim 22, wherein the client requests mapping information from a respective parent client when the parent client does not have mapping information desired by the requesting client.

24. The method of claim 22, further comprising playing the media stream for display to an end user using at least some of the local streamlets on media player in the requesting client.

25. The method of claim 22, further comprising enabling the client to check for streamlets listed in the mapping information that are playing at the highest quality level that the client can support, without regard for the available bandwidth from the external network.

* * * * *